(12) United States Patent
Hirn et al.

(10) Patent No.: US 6,220,115 B1
(45) Date of Patent: Apr. 24, 2001

(54) STEP-DOWN GEAR UNIT (75) Inventors: Helmut Hirn, Nehren; Franz Laudenbach, Gosheim, both of (DE)

(73) Assignee: IMS Morat Soehne GmbH (DE)

( * ) Notice: Subject to any disclaimer, the term of this patent is extended or adjusted under 35 U.S.C. 154(b) by 0 days.

(21) Appl. No.: 09/242,837

(22) PCT Filed: Aug. 14, 1997

(86) PCT No.: PCT/DE97/01794
  § 371 Date: Jun. 24, 1999
  § 102(e) Date: Jun. 24, 1999

(87) PCT Pub. No.: WO98/08008
  PCT Pub. Date: Feb. 26, 1998

(30) Foreign Application Priority Data

Aug. 24, 1996 (DE) .............................................. 296 14 738

(51) Int. Cl.⁷ .................................................... F16H 49/00
(52) U.S. Cl. ............................................................ 74/640
(58) Field of Search .................................................. 74/640

(56) References Cited
FOREIGN PATENT DOCUMENTS

0206754A2 * 12/1986 (EP) .
0309197A2 * 3/1989 (EP) .
0514829A2 * 11/1992 (EP) .

OTHER PUBLICATIONS

"Breakthrough in mechanical drive design: The Harmonic Drive", Machine Design, 1960, pp. 160–173, Musser, C.W.*

* cited by examiner

Primary Examiner—Dirk Wright
(74) Attorney, Agent, or Firm—Pendorf & Cutliff

(57) ABSTRACT

The invention concerns a step-down gear unit with a rigid support ring (1), comprising a substantially cylindrical support surface (1), and with a radially flexible rolling collet (5) which has an outer generated surface (7) with a smaller peripheral length than the support surface (2), one or a plurality of peripheral sections of the outer generated surface (7) being held in substantially slip-free engagement in continuous exchange with the support surface (2) of the support ring (1) by one or a plurality of parts lying on an enveloping circle of a drive core (20) which is rotatably disposed inside the rolling collet (5) and is rotated by a drive shaft (14). The enveloping circle (20) of the driven elliptical drive core (20) has a substantially smaller diameter (Dh) than the basically cylindrical rolling collet (5). The rolling collet (5) is supported on the drive core (20) by a plurality of substantially radial transmission elements (32) which are all of equal length.

30 Claims, 5 Drawing Sheets

STEP-DOWN GEAR UNIT

BACKGROUND OF THE INVENTION

1. Field of the Invention

The invention relates to a step-down gear system.

2. Description of the Related Art

Mechanisms of this kind are known in the technical field under the term "harmonic drive systems" (Dubbel, *Taschenbuch für Maschinenbau,* 15th Edition, page 1069; company publication by Harmonic Drive System GmbH, 63225 Langen/Hessen).

These mechanisms essentially comprise three basic units, i.e.:

a) the so-called wave generator, being the actual drive unit. This includes an elliptical core, on which is mounted a ball bearing and which is also provided with the input shaft;

b) the so-called flex spline, which is a fundamentally cylindrical but radially flexible steel bush (rolling bush) having external toothing, in which the elliptical core is arranged for rotation, and finally c) the so-called circular spline. This part is an internally-toothed stationary support ring, the teeth of which constantly mesh with the elliptically deformable flex spline, i.e. with said deformable steel bush. In this regard, the internally-toothed support ring has a greater number of teeth than the flexible steel bush, two diametrically opposing peripheral sectors of which constantly mesh with the internal toothing of the stationary support ring. As a result of the rotation of the elliptical core in the flexible steel bush, all the teeth of the steel bush are caused to mesh, one after the other, with the teeth of the internal toothing of the stationary support ring during each rotation, as a result of which a rotation of the steel bush by the difference of the number of teeth takes place.

Using these mechanisms which have a very compact structure, it is possible to achieve considerable speed reduction ratios or step-downs. The rotational directions of the drive and of the output are, however, opposite directions. The formula for calculating the respective gear ratios is:

$$i = \frac{Z_2}{Z_1 - Z_2}$$

wherein $Z_1$ is the number of teeth of the flexible steel bush, and $Z_2$ the number of teeth of the stationary internally-toothed support ring. According to information received from the manufacturer of such harmonic drive mechanisms, gear ratios of from 1:72 to 1:320 are possible.

Mechanisms of this kind are used primarily in special purpose machines and industrial robots.

In a known design of such an harmonic drive mechanism (EP 0 514 829 A2), the radially flexible steel bush is designed to be pot-shaped and is provided with a stable end wall at an axial spacing from its external toothing. The thin, basically cylindrical, wall of the steel bush is flexibly deformable, such that it is capable of adapting, on the one hand, to the cylindrical shape of the end wall and, on the other hand, flexibly adapting to the rotating elliptical circumference of the core of the mechanism, i.e. the so-called wave generator.

In other designs of such mechanisms, as the transmission element between the flexible steel bush, i.e. the flex spline, and a transmitting wave (DE 39 06 053 C2 and EP 0 309 197 B2), in each case a second toothed ring comprising an internal toothing is provided and this is arranged coaxially relative to the first stationary internally-toothed support ring, and has, at least substantially, the same inside diameter as the stationary support ring, but a number of teeth differing from that of the stationary support ring. In this regard, the teeth of the flexible steel bush mesh both with the stationary support ring and with the rotating toothed ring, namely in a manner such that the rotation of the flexible steel bush is transmitted directly to the rotating toothed ring, moreover at a ratio of 1:1, since the rotating toothed ring has the same number of teeth as the flexible steel bush which, of course, during the rotation of the elliptical drive core, rolls in the gear rim of the stationary support ring.

The steel bush will hereinafter be referred to as a rolling bush.

In principle, the method of functioning of the generic step-down gear system resides in that peripheral surfaces of different lengths roll off on each other slip-free, as a result of which, during rolling, the shorter peripheral surface rotates by the difference in length.

Since all the individual parts of these known mechanisms are of steel or a similar material, and the mechanisms are, as a rule, equipped with radially flexible, i.e. deformable, ball bearings which are arranged between the peripheral surface of the elliptical drive core and the flexible rolling bush, these mechanisms involve considerable manufacturing costs, especially since a high degree of finishing accuracy is a pre-requisite for trouble-free functioning.

SUMMARY OF THE INVENTION

The object underlying the invention is to design a step-down gear system of the kind mentioned at the outset, such that it is possible for its individual components to be manufactured more simply and more economically but, in particular, so as to have small dimensions, and to be assembled quite readily and, in particular, automatically, such that it is possible to achieve a higher degree of efficiency, a play-free engagement and greater gear reduction or higher speed reduction ratios, while keeping friction losses to a minimum.

This object is met by a step-down gear system comprising a rigid support ring (1), which has a substantially cylindrical supporting surface (2); a radially flexible roller bushing (5), which has an outer peripheral surface (7) having a shorter circumferential length than the supporting surface (2); a drive shaft (14); and a drive core which is non-circular in cross section, and which can be brought into rotation by the draft shaft (14) and thereby describes an enveloping circle; such that by the rotational movement of the non-circular core (20) at least one peripheral sector of the outer peripheral surface (7) of the roller bushing (5) is progressively held in a substantially slip-free engagement with the supporting surface (2) of the support ring (1), and further wherein the enveloping circle of the non-circular drive core (20) has a substantially smaller diameter ($D_h$) than the basically cylindrical roller bushing (5), and the roller bushing (5) is supported on the drive core (20; 20/1) by means of a plurality of essentially radially extending transmission elements (32; 33) of equal length.

In comparison to known mechanisms of the generic type, the design according to the invention provides not only the means for a far more economical production, but also a far greater range of design variations and, in particular, a very small and compact construction. It is also possible to achieve the precision of the transmission of the rotational movement using considerably simplified means. This is due to the fact that, in the design of the mechanism according to the invention, no roller or ball bearing is required in any instance between the rolling bush and the drive core, or the bearing hub surrounding the latter.

A further important advantage is that the mechanism is self-locking, which means that no torque, no matter the magnitude thereof, exerted on the rolling bush is capable of turning the drive shaft forward or backward. At the same time, this also means that the transmitting shaft, which is in transmitting connection as a result of the rolling bush, in each case assumes an accurately defined angular position when the mechanism is idle or the drive is inactive, and it is possible for this angular position to be changed in the one or the other direction only by means of the drive, i.e. by a corresponding rotation of the drive core.

Known mechanisms of the generic type do not include a self-locking feature.

The drive core, by means of which the transmission elements are radially deflectable, expediently comprises a single part. It is, however, within the scope of the invention for the drive core to comprise a plurality of parts. The crucial factor herein is that the multipart drive core also causes one or more peripheral sectors of the outer peripheral surface of the flexible rolling bush to engage in continuous alternation with the supporting surface of the support ring.

In order to reduce the friction between the transmission elements and the drive core, the design in which the radially inwardly disposed ends of the transmission elements are supported on a radially flexible bearing hub is advantageous.

As a result of the design with the inside diameter of the bearing hub smaller than that of the cylindrical roller bushing by at least one quarter to one third, it is possible to achieve very good or optimal force and torque ratios and the means to provide very high gear ratios or gear reduction ratios.

With the design as described below, it is possible to ensure not only a very high degree of functional reliability, but also a functioning which is very low in wear and, in particular, very precise.

A particularly economical embodiment below, while the design with plastic hub ensures minimal friction losses and, thus, a high degree of efficiency.

The design with frictional engagement provides a means for selecting, within certain limits, any gear ratio, since the circular pitch, in a frictional engagement, has the value of zero, and the gear ratio or gear reduction ratio achieved is determined exclusively by the differences in length of the peripheral lengths of the friction surfaces rolling off against each other.

Accordingly, it is also possible to select gear reduction ratios, the denominators in respect of which are not an integral number, but which may also comprise a decimal fraction.

Instead of a purely frictional engagement, it is, of course, also possible to provide very small or fine circular pitches, it being possible, in certain cases in which a precise isogonal drive transmission is not a crucial factor, for irregular toothing to be provided, for example in the form of corrugations, knurling or the like.

An advantageous design in this regard with external toothing axially adjacent to the periperal surface sector as discussed below in as much as this design ensures that it is possible to transmit, isogonally and without loss, the rotary movement of the rolling bush.

A very advantageous design of the invention is set out has the driven annular gear associated with a transmitting shaft which is coaxial with the support ring. As a result hereof, it is possible to ensure that the connection between the rolling bush and the transmitting shaft is also produced very economically and in a functionally direct manner.

An alternative to the above has the driven annular gear in transmitting connection with a transmitting shaft via additional gear parts. As a result of this design, it is possible, by means of additional gear parts, to gain additional gear reduction ratios.

While the design wherein the internal toothing of the driven annular gear has the same number of teeth as the rolling bushing, but at least substantially the same reference diameter and/or inside diameter as the internal toothing of the support ring is, in principle, known in the prior art mechanisms of the generic type, the design wherein the internal toothing of the driven of the driven annular gear meshing with the external toothing of the rolling bushing has a different number of teeth than the rolling bushing provides a further alternative, which opens up further possibilities for the use of additional gear ratios.

The design with transmission elements designed as rams as discussed below is advantageous for embodiments of the step-down gear system according to the invention, which embodiments are more exacting as far as the performance is concerned, because it is possible for the transmission elements, which are designed to be rams, to be produced from a different material which has a higher load-carrying capacity than that of the spokes of a complete plastics part. It is thus also possible for greater radial forces to be transmitted from the drive core to the rolling bush, which is an advantage and of considerable functional significance in particular in the case of very fine toothing or irregular toothing or for frictional transmission of force.

The design wherein the rams are plate-shaped metal parts which are guided in radial guides of a plastic guide cage has proved to be most appropriate in this regard.

Two embodiments are disclosed wherein the guide cage is guided and centered via an end wall on an annular surface which is concentric with the support ring, and wherein the guide cage is integrally moulded on a driven annular gear which is also of plastic relate to two advantageous design options, as far as the shape and arrangement of the guide cage for the transmission elements, designed to be rams, are concerned.

With the design wherein the internal toothing of the support ring is designed to be radially flexible, a simply produced means is provided to compensate for process tolerances in order to achieve an absolutely play-free engagement of the teeth between the rolling bush and the support ring.

Instead of an elliptical drive core, comprising two diametrically oppositely disposed eccentric cams or protuberances, it may be advantageous and expedient for certain uses, in particular uses which involve high torques on the transmitting shaft, to provide the design wherein the drive core comprises three protuberances, in the use of which, in each case, three peripheral sectors of the rolling bush are simultaneously in force-locking or in form-locking engagement with the inner surface or toothing of the support ring.

The design wherein the support ring is part of the cylindrical housing serves to ensure the expedient and protective encapsulation of the, possibly, highly precise gear parts.

BRIEF DESCRIPTION OF THE DRAWINGS

The invention will be described in more detail hereinafter with reference to the drawing, in which.

DETAILED DESCRIPTION OF THE INVENTION

Various embodiments of a step-down gear system, the basic components of which are, in each case, a circular support ring 1, which has a circular inner supporting surface 2, a rolling bush 5, which has an outer peripheral surface 7, and an elliptical or triangular drive core 20 or 20/1, respectively, will be described hereinafter with reference to the Figures set out above.

Figures 1, 2, 3, 4:
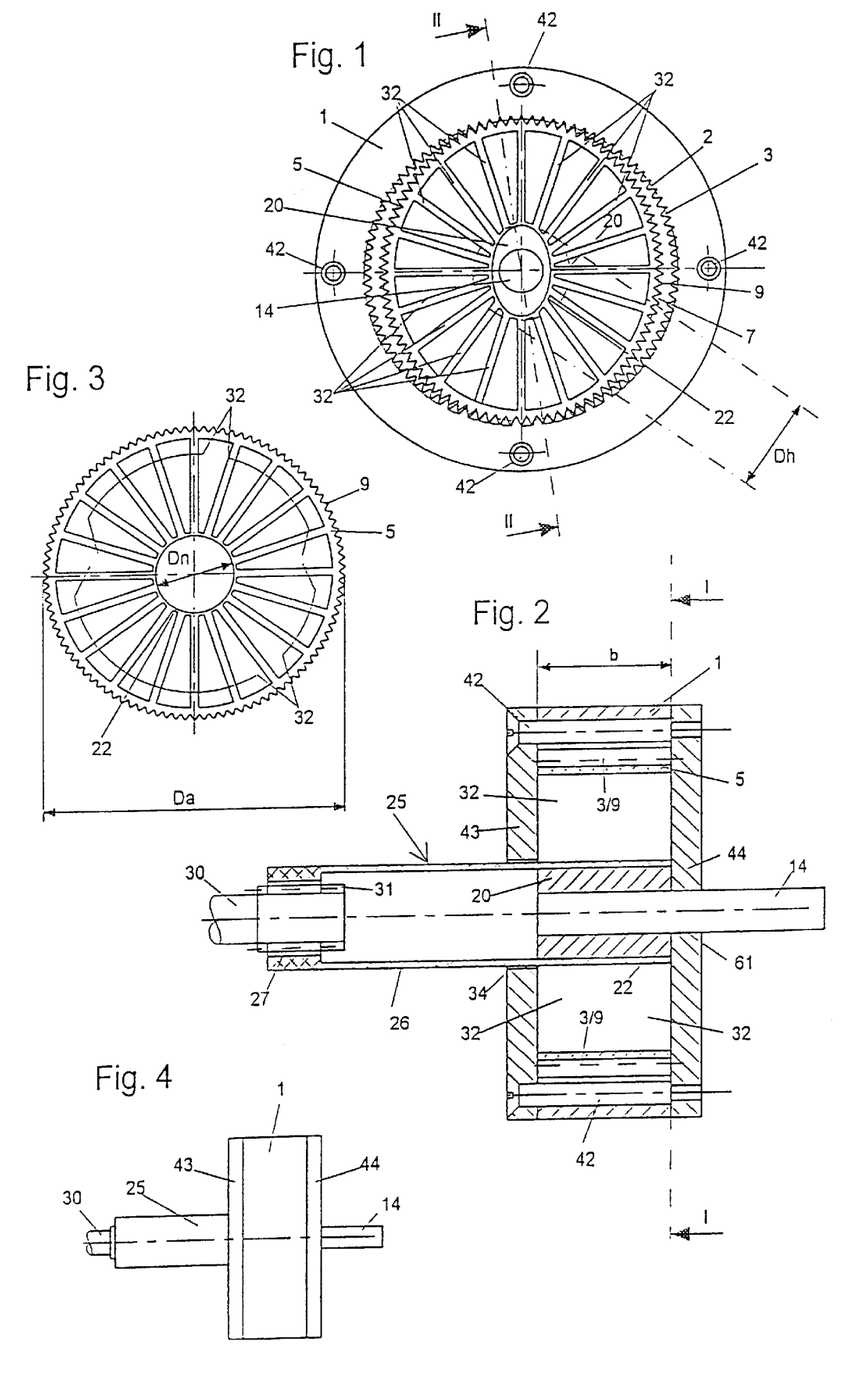
FIG. 1 shows a front view of a step-down gear system along the line I—I of FIG. 2.
FIG. 2 shows a section II—II of FIG. 1.
FIG. 3 shows the plastics body, which comprises the rolling bush, the spokes and the bearing hub, in the same front view as in FIG. 1.
FIG. 4 shows a side view of the step-down gear system in its true-to-life size.

In the exemplified embodiment of FIGS. 1, 2 and 3, the cylindrical support ring 1 is provided with an internal toothing 3 which extends across its entire breadth b. Said support ring 1, as the stationary gear part, is non-rotatably connected to any mechanism carrier or the like, which is not illustrated in the drawing. At its two side end faces, in each case, end walls 43 and 44 are arranged and are interconnected or connected to the support ring 1 by means of axial screws 42. In a central bore 61 of the end wall 44, a drive shaft 14 is supported for rotation and is, for example, in communication with a drive motor, by means of which it is designed to be driven in the one or the other direction of rotation. The drive core 20 is secured for rotation on said drive shaft 14, such that the drive core 20 also rotates isogonally with the drive shaft 14, when the latter is driven.

The basically circular rolling bush 5 is provided to have external toothing 9 which, in the exemplified embodiments according to FIGS. 1 to 3, has the same breadth b as the support ring 1 or its internal toothing 3. As can be seen in FIG. 1, this external toothing 9 of the rolling bush meshes with the internal toothing 3 of the support ring 1, via a plurality of teeth, in each case, in the region of two diametrically oppositely disposed peripheral sectors. This is possible because the rolling bush 5 is radially flexible and is integrally connected, via radial transmission members which, in the present instance, are designed to be spokes 32, to an inner bearing bush 22 within which the drive core 20 is arranged for rotation.

In this regard, the inside diameter $D_n$, i.e. the resultant inner circumferential length of the bearing bush 22, is selected such that, in the assembled state as shown in FIGS. 1 and 2, it surrounds the elliptical drive core 20 at least substantially free of play.

The inside diameter $D_n$ of the basically cylindrical bearing hub 22 is smaller, by at least a quarter to a third, than the outside diameter $D_a$ of the also basically cylindrical rolling bush 5. In the exemplified embodiment illustrated in FIGS. 1 to 3, the rolling bush 5 and the bearing hub 22, together with the transmission elements designed to be spokes 32, form a single-piece structural part 35 of plastics material, which is economical to produce and simple to assemble. As a result of the relatively high degree of flexibility which the bearing hub 22 may have in this regard, it is also very simple to insert the non-circular drive core 20 in the bearing hub 22.

As a result of the rotary movement of the eccentric, i.e. elliptical, drive core 20 in the bearing bush 22, the latter is continuously deformed elliptically. This elliptical deformation is also transmitted to the rolling bush 5 via the spokes 32, such that different teeth of the external toothing 7 of the rolling bush 5 continuously mesh with the internal toothing 3 of the stationary support ring 1.

In so doing, because the number $Z_1$ of teeth of the external toothing 9 of the rolling bush 5 is smaller than the number $Z_2$ of teeth of the internal toothing 3 of the support ring 1, a continuous rotation of the rolling bush 5 relative to the stationary support ring 1 takes place, said rotation being in a direction opposite to the direction of rotation of the drive shaft 14, i.e. the drive core 20.

As already mentioned above, the resultant gear ratio between the number of revolutions of the drive shaft 14 and the number of revolutions of the rolling bush 5 is calculated according to the following formula:

$$i = \frac{Z_2}{Z_1 - Z_2}$$

For example, when the rolling bush 5 has the number of teeth $Z_1$=98, and the support ring 1 has the number of teeth $Z_2$=100, a gear ratio of i=1:50 is calculated according to the above formula.

Instead of the number of teeth, it is also possible to use the circumferential lengths of the inner surface 2 as $Z_2$, and the circumferential length of the outer peripheral surface 7 of the rolling bush 5 as $Z_1$, producing the same result.

The aforegoing is intended to show that it is not absolutely essential to provide for a meshing of teeth between the support ring 1 and the rolling bush 5, but that it is indeed possible for the mechanism to be designed to be a pure friction gear, as will be described in more detail hereinafter.

As can be seen in FIG. 2, the bearing hub 22 comprises, as a connecting member 25, an also basically cylindrical thin-walled and flexibly deformable hollow shaft 26 which is coupled, via an internal toothing 27, to a pinion 31 of a transmitting shaft 30. In this regard, the hollow shaft 26 is provided with adequate radial play and passes through a correspondingly wide central axial bore 34 in the end wall 43.

As a result of this connecting member 25, the rotary movements of the rolling bush 5, or of the bearing bush 22, are transmitted to the transmitting shaft 30.

Figure 5:
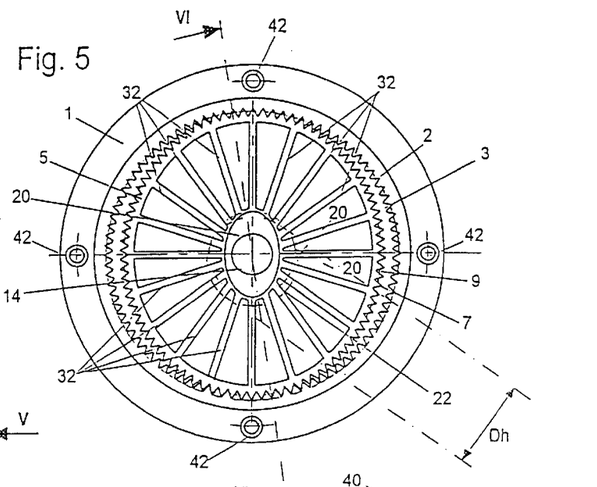
FIG. 5 shows a side view V—V of FIG. 6 of a step-down gear system, which is provided with a different driven device.
Figure 6:
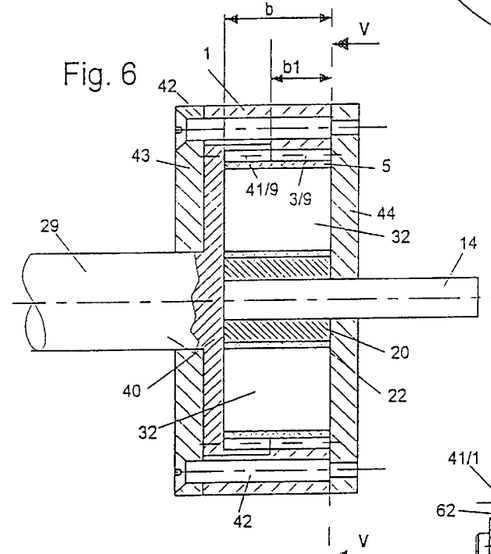
FIG. 6 shows a section VI—VI of FIG. 5.

The exemplified embodiment illustrated in FIGS. 5 and 6 differs from the exemplified embodiment of FIGS. 1 to 3 described above essentially in that a driven annular gear 40, comprising an internal toothing 41, is provided as the connecting member between the rolling bush 5 and a transmitting shaft 29, and forms a single-piece structural part together with the transmitting shaft 29. In this regard, the internal toothing 3 of the support ring 1 has a smaller axial breadth b1 than the external toothing 9 of the rolling bush 5 having the breadth b.

The internal toothing 41 of the driven annular gear 40 has a number of teeth $Z_3$ which corresponds, at least substantially, to the number of teeth $Z_1$ of the external toothing 9 of the rolling bush 5 which meshes with the internal toothing 3 of the support ring 1.

In order, however, to ensure that a rotary movement of the driven annular gear 40 is also produced during a rotary movement of the rolling bush 5, the number of teeth $Z_3$ of the internal toothing 41 of the driven annular gear 40 must differ from the number of teeth $Z_2$ of the internal toothing 3 of the support ring 1.

When the number of teeth $Z_3$ of the internal toothing 41 corresponds to the number of teeth $Z_1$ of the external toothing 9 of the rolling bush 5, the gear ratio between these two sets of toothing 41 and 9 will be 1:1.

When the number of teeth $Z_3$ of the internal toothing 41 is greater than the number of teeth $Z_1$ of the rolling bush 5, there will be a further speed reduction ratio; when the number of teeth $Z_3$ is less than the number of teeth $Z_1$, there will be an additional speed increase ratio. When the internal toothing 41 has, for example, one tooth fewer than the external toothing 9, then the driven annular gear 40 will, during a complete rotation of the rolling bush 5, turn onward through one circular pitch further than the rolling bush 5. When, in contrast, the internal toothing 41 has one tooth more than the rolling bush 5, then the driven annular gear 40, during a full rotation of the rolling bush 5, will execute a rotary movement which is less, by one circular pitch, than a complete rotation.

Figure 9:
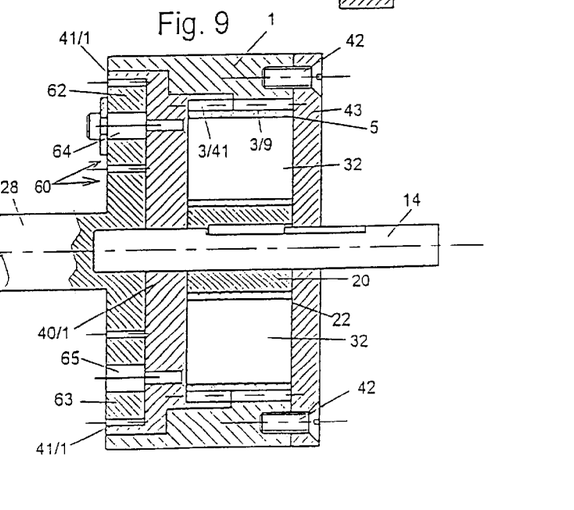
FIG. 9 shows a sectional illustration of a different embodiment of the step-down gear system, in which the driven annular gear is in transmitting connection with a transmitting shaft via additional gear members.

FIG. 9 shows a variation of the step-down gear system illustrated in FIGS. 5 and 6, in which the driven annular gear 40/1, with its internal toothing 41, meshes in the same manner with the external toothing 9 of the rolling bush 5. In contrast to the driven annular gear 40, however, the driven annular gear 40/1 does not comprise a transmitting shaft. Indeed, it is transmittingly connected to a transmitting shaft 28 via additional gear members 60. Said gear parts 60 comprise two diametrically oppositely disposed planet wheels 62 and 63, which are supported for rotation on eccentrically arranged bearing journals 64 and 65, and which mesh, on the one hand, with an internal toothing 41/1 of the driven annular gear 40/1 and, on the other hand, with a toothed wheel 28' which is integrally connected to the transmitting shaft 28. It is possible for the gear reduction ratio between the drive shaft 14 and the transmitting shaft 28 to be changed additionally, by means of such additional gear parts 60. In particular, in this manner, it is possible to achieve still greater gear reductions or speed reduction ratios.

As is already the case in known step-down gear systems of the generic type, it is also very readily possible, in the step-down gear system according to the invention, to produce a completely play-free teeth meshing between the teeth of the rolling bush 5 and the teeth of the support ring 1, especially since additionally improved conditions are provided in that the teeth of the rolling bush 5, which is of a plastics material, are softer and thus also more flexible than the rigid teeth of the support ring 1 which is usually of steel, brass, aluminium or any other hard metal. This combination of materials also contributes considerably to a completely silent functioning of the mechanism according to the invention, while it is, of course, possible for certain applications or fields of application to produce the two meshing parts of plastics material or of metal.

Depending on the intended use and the field of application, it is possible for the driven annular gear 40 or 40/1 to be produced of plastics material or of metal, the production using plastics material in an injection-moulding process obviously being far more economical.

Figures 10, 11, 12:
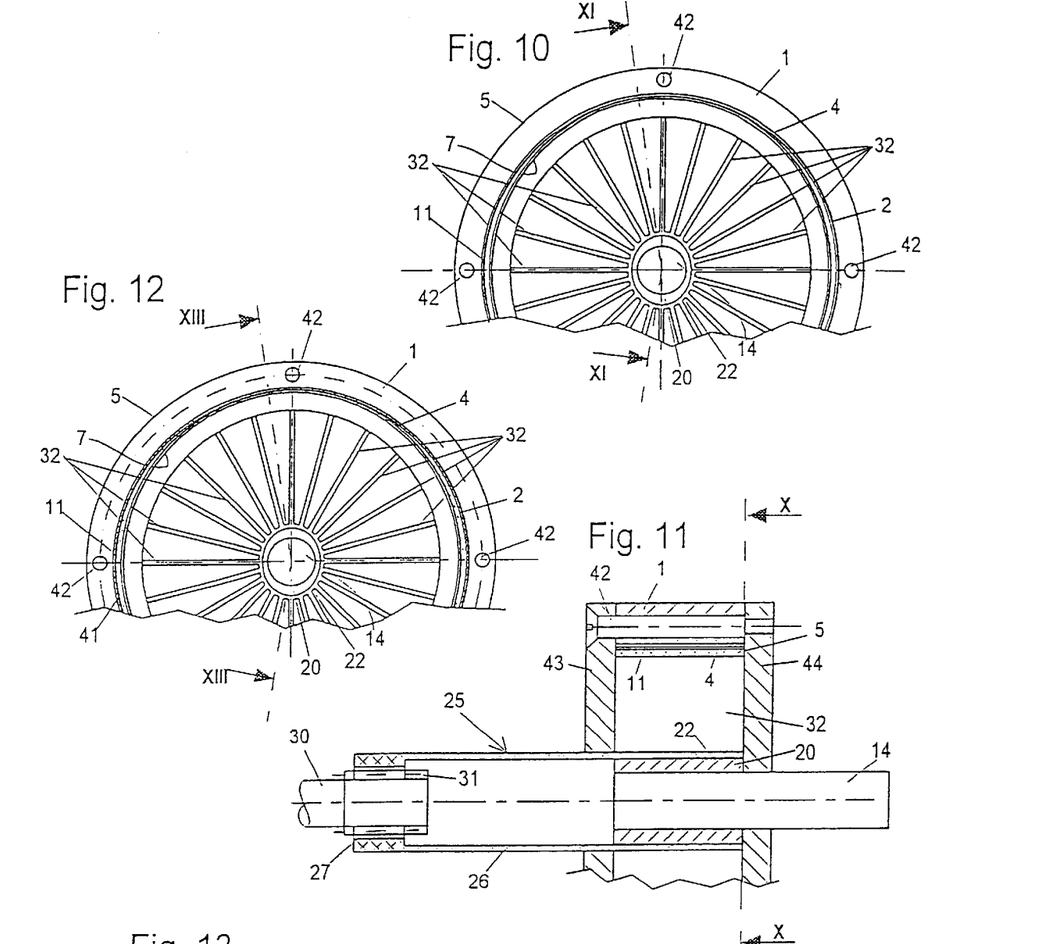
FIG. 10 shows a partial front view along line X—X of FIG. 11 of an embodiment in which the inner surface of the support ring and the peripheral surface of the rolling bush are, in each case, provided with friction linings and in which the bearing hub of the rolling bush, as in the exemplified embodiment according to FIGS. 1 to 4, is coupled to a transmitting shaft via a flexible connecting member.
FIG. 11 shows a section XI—XI of FIG. 10.
FIG. 12 shows an exemplified embodiment, in which the rolling bush, which frictionally engages the support ring, engages a driven annular gear via a toothing, in the same view as FIG. 10.

FIGS. 10 and 11 show an embodiment which differs from the embodiment of FIGS. 1 and 2 only in that the inner surface 3 of the support ring 1 is provided with a friction lining 4, and the peripheral surface 7 of the rolling bush 4, which comprises spokes 32 and a bearing hub 22, is provided with a friction lining 11, and that, instead of a meshed engagement, a frictional engagement is produced between the support ring 1 and the rolling bush 5.

Figure 13:
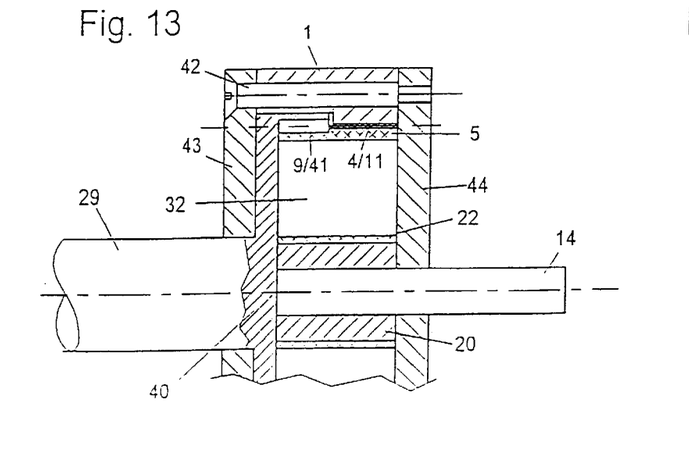
FIG. 13 shows a section XIII—XIII of FIG. 12.

In the embodiment of FIGS. 12 and 13, the basic design of which is similar to the embodiment according to FIGS. 5 and 6, the inner surface 2 of the support ring 1 and the peripheral surface 7 of the rolling bush 5 are, in each case, provided with friction linings 4 and 11, respectively, which extend across the breadth b1. Axially adjacent, an external toothing 9 of the rolling bush 5 meshes with the internal toothing 41 of a driven annular gear 40.

Figures 22, 23, 24, 25, 25A, 26, 26A, 27:
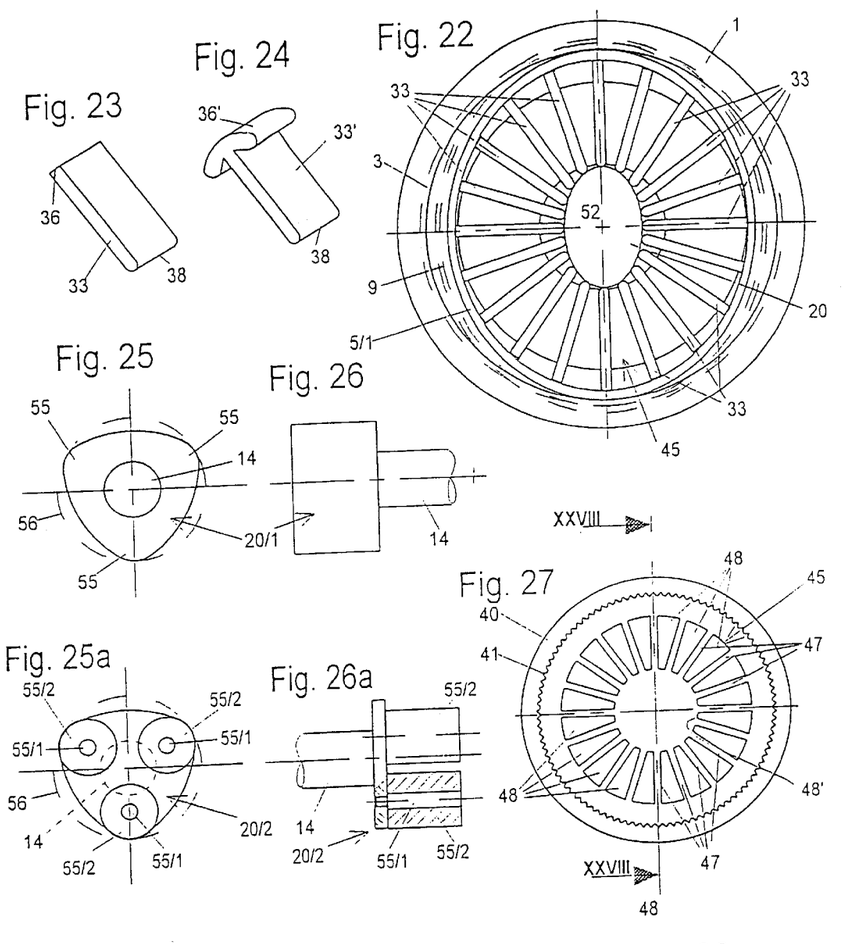
FIG. 22 shows the open end view of an embodiment of the step-down gear system in which the transmission members between the drive core and the rolling bush comprise rams.
FIG. 23 shows an isometric view of a ram as a separate part.
FIG. 24 shows an isometric view of a ram which is provided with a widened supporting surface, as a separate part.
FIG. 25 shows a front view of a triangular drive core, i.e. a drive core provided with three eccentric protuberances.
FIG. 25a shows a front view of a different embodiment of the drive core of FIG. 25.
FIG. 26 shows a side view from FIG. 25.
FIG. 26a shows the drive core of FIG. 25a in a partially sectioned side view.
FIG. 27 shows a front view of a driven annular gear comprising an inserted guide cage.

FIGS. 14 to 17 illustrate an embodiment of the rolling bush 5, in which the spokes 32, which are integrally connected thereto, are each provided with metal inserts 37. Said metal inserts 37, in each case, comprise foot ends 38, which protrude inwardly freely from the bearing bush and by means of which it is possible for said inserts to be supported directly on the peripheral surface 52 of the drive core 20 (FIG. 22). In this regard, in order to ensure a favourable frictional behaviour, it is advisable to select the known combinations of materials, e.g. bronze and steel, brass and steel, or the like.

Figures 15, 16:
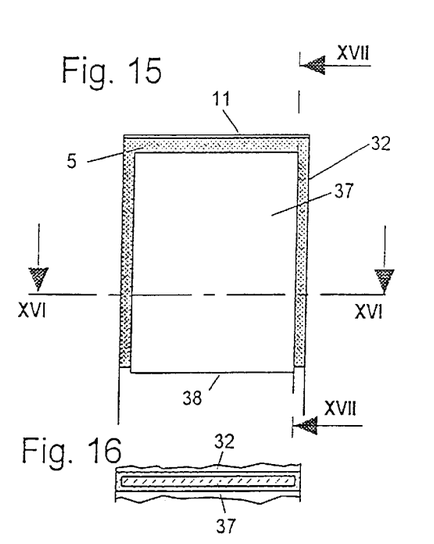
FIG. 15 shows a partial section XV—XV of FIG. 14.
FIG. 16 shows a section XVI—XVI of FIG. 15.
Figure 17:
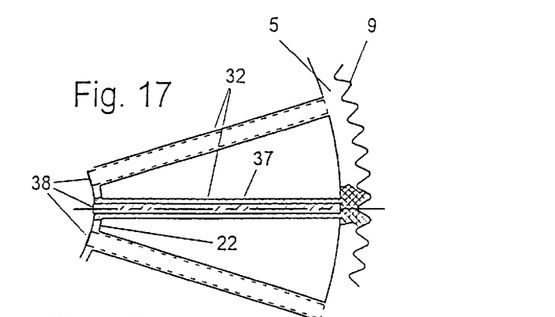
FIG. 17 shows a section XVII—XVII of FIG. 15.

As can be seen in FIGS. 15 to 17, the metal inserts 37 are, in each case, completely sheathed with a plastics material, with the exception of their foot ends.

Metal inserts 37 of this kind are expedient and advantageous, in particular in cases when considerable radial forces are to be transmitted, for example in order to achieve a slip-free frictional engagement between the peripheral surface 7 of the rolling bush 5, which peripheral surface is optionally provided with a friction lining 11, and the inner surface 3 of the support ring 1. It may, in this regard, also be advisable to equip the outer annular body of the rolling bush 5, itself, with an annular metal insert, which will bring about an improved distribution of force in the peripheral direction. Metal inserts 37 of this kind are, of course, also expediently used in rolling bushes 5 which are provided with an external toothing 7.

Figure 18:
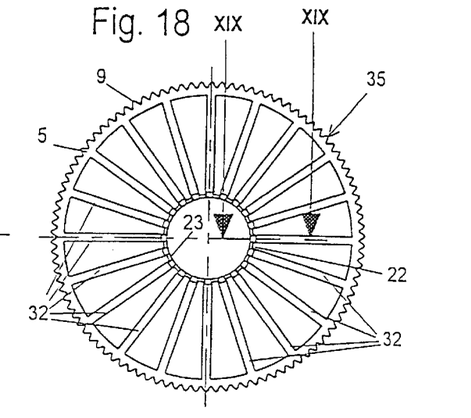
FIG. 18 shows the front view of a different embodiment of the single-pieced rolling bush comprising spokes and a bearing hub.
Figure 19:
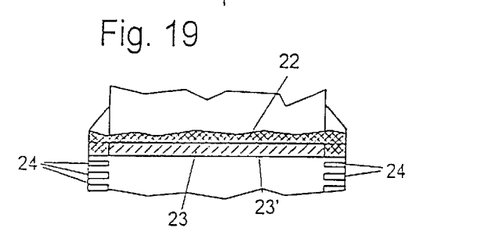
FIG. 19 shows a partial section XIX—XIX of FIG. 18.

It may also be expedient and advantageous when the bearing hub 22 of a rolling bush 5 is provided with a bearing sleeve 23 of metal, in order to reduce wear resulting from friction within the bearing hub 22 to a minimum. An exemplified embodiment of this nature is illustrated in FIGS. 18 and 19. In these Figures, a metal bearing sleeve 23 is embedded in the bearing hub 22 such that its smooth inner surface 23 ', which has low friction-causing characteristics, surrounds the drive core 20 at least in a substantially play-free manner. In order to prevent a rotation of said bearing sleeve 23 in the bearing hub 22, and in order to secure it axially in position, said bearing sleeve is provided at its front ends, in each case, with slit-shaped recesses 24 which are filled from the outside with the plastics material of the bearing hub 22.

Figure 14:
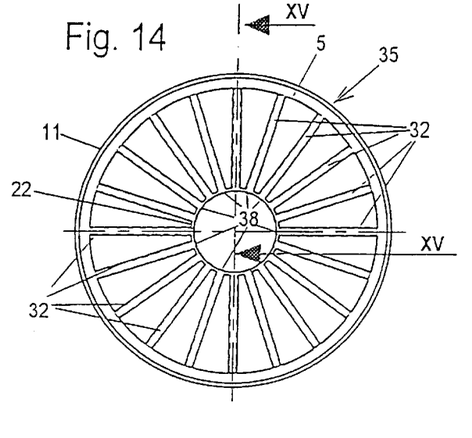
FIG. 14 shows the front view of a rolling bush, which comprises radial spokes and a bearing hub and the spokes of which are provided with metal inserts.

In the completed state, the rolling bushes 5 of FIG. 14 and 18, in each case, form a uniform structural part 35, which is simple to produce and is also simply and technically correctly installed in the mechanism.

Figure 20:
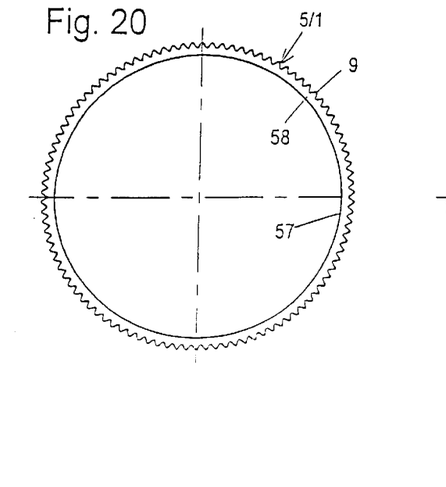
FIG. 20 shows a front view an externally-toothed rolling bush without spokes, ram and bearing bush.

FIG. 20 shows the front view of a rolling bush 5/1 which does not, however, comprise any spokes nor a bearing hub. It merely comprises an annular radially flexible body 58 having an external toothing 9.

Figure 21:
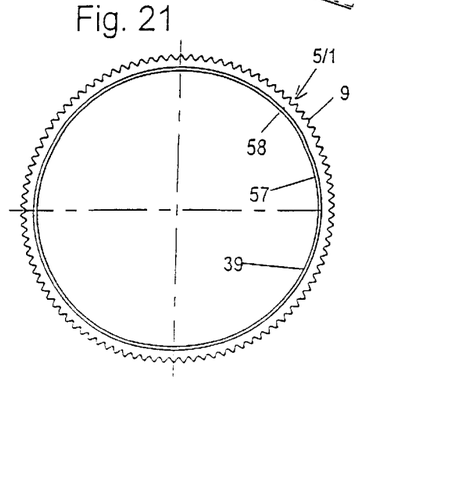
FIG. 21 shows the rolling bush of FIG. 14 with an inserted metal ring.

In the embodiment of FIG. 21, said rolling bush 5/1 is provided with a thin-walled annular metal insert 39. When using such rolling bushes 5/1, the transmission of force from the drive core 20, which, as a rule, is elliptical, takes place via a plurality of rams 33 or 33', respectively, which are guided for radial displacement and are supported, via rounded-off inner foot ends 38, directly on the peripheral surface 52 of the drive core 20, and the outer ends of which are provided with a curved supporting surface 36 and 36', respectively, which may optionally be widened in both directions. It is by means of these supporting surfaces 36 and 36' that said rams 33 and 33', respectively, transmit the radial deformation forces and movements to the annular body 58 of the externally-toothed rolling bush 5/1, the toothing 9 of which, in this manner, circumferentially meshes with the teeth of the internal toothing 3 of the support ring 1.

Said rams 33 or 33' are, in each case, guided in slot-shaped radial guides 47 of a hollow-cylindrical guide cage 45 and 45/1, respectively, which is arranged and centered within the rolling bush 5/1 concentrically with the internal toothing 3 of the support ring 1. It is possible for this guide cage 45, 45/1, for example, to be of plastics material. In the exemplified embodiment illustrated in FIGS. 27 and 28, its sectors 48, which form the slot-shaped radial guides 47, are provided with a common end wall 49 which is designed to be circular and is centered in a cylindrical recess 49' of a driven annular gear 40 which is of metal.

Figure 28:
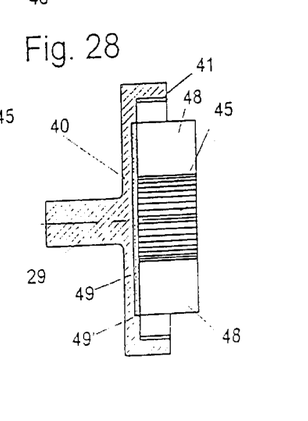
FIG. 28 shows a section XXVIII—XXVIII of FIG. 27.

In this regard, the sectors 48 form a circular hollow space 48' in which the drive core 20 rotates freely. The outside diameter of said sectors is also selected such that the elliptical radial deformation of the rolling bush 5/1, or the radial movement of the rams 33', which are provided with widened supporting surfaces 36', is not adversely affected.

Figure 29:
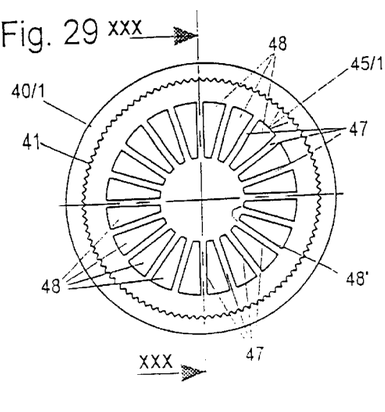
FIG. 29 shows the front view of a different driven annular gear comprising a guide cage which is moulded on in a single piece.
Figure 30:
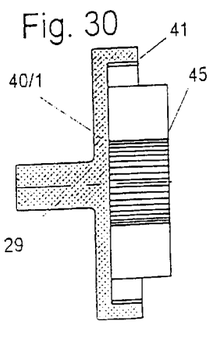
FIG. 30 shows a section XXX—XXX of FIG. 29.

In the exemplified embodiment illustrated in FIGS. 29 and 30, the guide cage 45/1 is integrally connected to a driven annular gear 40, which is also of plastics material.

It is readily conceivable that, instead of an elliptical drive core 20, it is also possible to use a drive core 20/1 which is designed to be triangular, i.e. which is provided to have three radial protuberances 55 which are disposed on a common circumscribed circle 56, and by means of which three peripheral sectors, in each case offset by 120° relative to one another, of the rolling bush mesh with the inner supporting surface 2, or its toothing 3 (see FIG. 25). An advantageous use of a triangular drive core of this type is, in particular, when very fine toothing, with a small height of the teeth, or a frictional engagement is being used. In the event of teeth being used, care should then be taken that the differences in teeth between the toothing 3 of the support ring 1 and the toothing 9 of the rolling bush 5 or 5/1 should be an integral number which is divisible by three. For a frictional engagement, this is irrelevant.

A further design option in respect of the drive core is illustrated in FIGS. 25a and 26a. In this embodiment, the drive core is a triangular disc 20/2 which is provided, on the one side, with the drive shaft 14 and, on the oppositely disposed side, with three rollers 55/2 which are offset by 120° relative to one another. Said rollers 55/2 are, in each case, supported for rotation on cylindrical bearing journals 55/1 of the disc 20/2, and are otherwise arranged and designed such that their cylindrical peripheral surfaces are disposed on the common circumscribed circle 56 which is coaxial with the axis of the drive shaft 14, as is the case in respect of the protuberances 55 of the exemplified embodiment of FIGS. 25 and 26.

This shows that it is also possible for the drive core to have a multipart design.

In order to ensure an absolutely reliable play-free meshing position, even in the case of critical tooth profiles for the toothing 9 of the rolling bush 5 or 5/1, on the one hand, and the toothing 3 of the support ring 1, on the other hand, while ensuring the minimum of friction-induced wear, it is advantageous and expedient to design the internal toothing 3 of the support ring 1 to be radially flexible. It is possible to provide this, for example by means of the embodiment illustrated in FIG. 6a. In this regard, a thin annular groove 70 is arranged between a relatively thin-walled annular body part 68, on which is attached the internal toothing 3, and the outer thick-walled annular body part 69, said annular groove extending axially substantially across the entire breadth b of the external toothing 9 of the rolling bush 5.

Figure 6A:
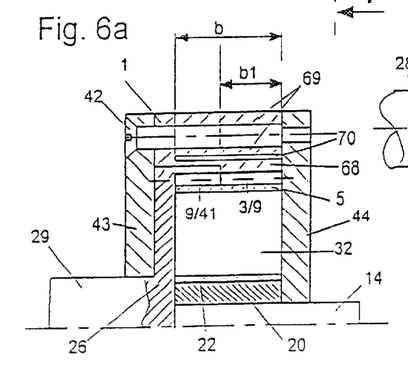
FIG. 6a shows half a sectional illustration of a variation of the embodiment of FIG. 6 in which the support ring is provided with a radially flexible internal toothing.
Figure 7:
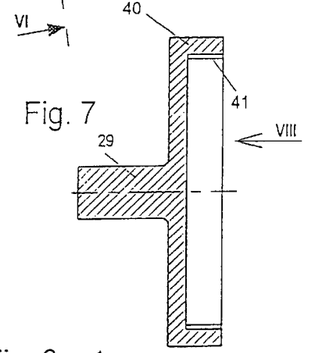
FIG. 7 shows a cross-section of a driven annular gear.
Figure 8:
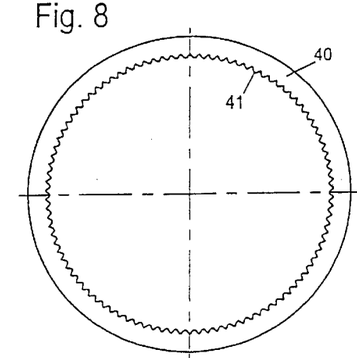
FIG. 8 shows a view VIII of FIG. 7.

That part of the support ring 1 which is provided with the toothing 3 is radially flexible in that the two sets of toothing 3 and 9 are designed to be pressed into each other radially completely without play. In this manner, it is possible to compensate fully for process tolerances.

What is claimed is:

1. Step-down gear system comprising:
    a rigid support ring (1), which has a substantially cylindrical supporting surface (2),
    a radially flexible roller bushing (5), which has an outer peripheral surface (7) having a shorter circumferential length than the supporting surface (2),
    a drive shaft (14), and
    a drive core which is non-circular in cross section, which can be brought into rotation by said draft shaft (14) and thereby describes an enveloping circle;
    such that by the rotational movement of the non-circular core (20) at least one peripheral sector of the outer peripheral surface (7) of the roller bushing (5) is progressively held in a substantially slip-free engagement with the supporting surface (2) of the support ring (1), and further wherein
    the enveloping circle of the non-circular drive core (20) has a substantially smaller diameter ($D_h$) than the basically cylindrical roller bushing (5), and
    the roller bushing (5) is supported on the drive core (20; 20/1) by means of a plurality of essentially radially extending transmission elements (32; 33) of equal length.

2. Step-down gear system according to claim 1, wherein the supporting surface of the support ring (1) is provided with an internal toothing (2), and the radially flexible rolling bushing (5) with an external toothing (7).

3. Step-down gear system according to claim 1, wherein the drive core (20) has an eccentric shape, in particular an elliptical shape.

4. Step-down gear system according to claim 1, characterized in that the rolling bushing (5) is in, or is designed to be brought into, a rotationally fixed connection with a transmitting shaft (30) via a connecting member (25).

5. Step-down gear system according to claim 1, characterized in that the transmission elements are designed to be spokes (32) or rams (33).

6. Step-down gear system according to claim 1, characterized in that the radially inwardly disposed ends of the transmission elements (32, 33) are supported on a radially flexible bearing hub (22) in which the drive core (20, 20/1) is supported for rotation.

7. Step-down gear system according to claim 1, characterized in that the inside diameter ($D_n$) of the basically cylindrical bearing hub (22) is smaller by at least one quarter to one third than the outside diameter ($D_a$) of the basically also cylindrical rolling bushing (5).

8. Step-down gear system according to claim 6, wherein the inner circumferential length of the bearing hub (22) is adapted to the circumferential length of the drive core (20; 20/1) such that the bearing hub (22) surrounds the drive core (20; 20/1) at least substantially free of play.

9. Step-down gear system according to claim 6, wherein the rolling bushing (5) and the bearing hub (22), together with the transmission elements designed to be spokes, form a single-piece structural part (35) of plastics material.

10. Step-down gear system according to claim 9, wherein the bearing hub (22), which is of plastics material, is provided with an also radially flexible bearing sleeve (23) of metal, which serves as a sliding bearing for the drive core (20) and surrounds the drive core (20).

11. Step-down gear system according to claim 10, wherein the spokes (32) comprise metal inserts (37) which are completely sheathed in plastics material and the foot ends (38) of which are slidingly supported directly on the peripheral surface of the drive core (20).

12. Step-down gear system according to claim 9, wherein characterized in that the bearing hub (22), which is connected to the rolling bushing (5) by means of the spokes (32), comprises, as a connecting member (25), a basically cylindrical hollow shaft (26) to which the transmitting shaft (30) is coupled.

13. Step-down gear system according to claim 1, wherein the rolling bushing (5) comprises an external toothing (9) which meshes with an internal toothing (3) of the support ring (1).

14. Step-down gear system according to claim 13, characterized in that the internal toothing (3) of the support ring (1) has a smaller axial breadth (b1) than the external toothing (9) of the rolling bush (5), and in that a cylindrical driven annular gear (40) is arranged concentrically with the support ring (1) and rotatable relative thereto, and with the internal toothing (41) of which, in each case, at least substantially the same teeth of the rolling bush (5) mesh as with the internal toothing (3) of the support ring (1).

15. Step-down gear system according to claim 1, wherein the inner surface (2) of the support ring (1) and the outer surface (7) of the rolling bushing (5/1) are in frictional engagement.

16. Step-down gear system according to claim 15, wherein the rolling bushing (5/1) comprises an external toothing (9) axially adjacent to its peripheral surface sector (11), which is in frictional engagement with an inner friction surface (11) of the support ring (1), which external toothing, in each case in the region of its peripheral sectors frictionally engaging the support ring (1), meshingly engages the internal toothing (41) of a driven annular gear (40) which is supported for rotation coaxially with the support ring (1).

17. Step-down gear system according to claim 15, wherein the driven annular gear (40) is provided with a transmitting shaft (29) which is coaxial with the support ring (1).

18. Step-down gear system according to claim 15 wherein the driven annular gear (40/1) is in a transmitting connection with a transmitting shaft (28) via additional gear parts (60).

19. Step-down gear system according to claim 12, wherein internal toothing (41) of the driven annular gear (40; 40/1) meshing with the external toothing (9) of the rolling bushing (5) has the same number of teeth ($Z_1$) as the rolling bushing (5), but at least substantially the same reference diameter and/or inside diameter as the internal toothing (3) of the support ring (1).

20. Step-down gear system according to claim 1, wherein the internal toothing (41) of the driven annular gear (40) meshing with the external toothing (9) of the rolling bushing has a different number of teeth ($Z_3$) than the rolling bushing (1).

21. Step-down gear system according to claim 1, wherein the transmission elements, which are designed to be rams (33) and are arranged between the rolling bushing (5, 5/1), on the one hand, and the drive core (20; 20/1) or the bearing hub (22), on the other hand, are supported to be radially displaceable in a cylindrical guide cage (45, 45/1) which surrounds the bearing hub (22) or the drive core (20; 20/1), and the outer ends (36) of which transmission elements loosely abut for support against an inner surface (57) of a rolling bushing (5/1), which is an annular body (58), and the inner foot ends (38) of which loosely abut for support against the peripheral surface (52) of the drive core (20, 20/1).

22. Step-down gear system according to claim 21, wherein the rams (33) are plate-shaped metal parts which are guided, in each case, in radial guides (47) of the guide cage (45, 45/1) of plastics material.

23. Step-down gear system according to claim 1, wherein the rams (33) are provided, at their radially outwardly disposed ends (36) with widened supporting surfaces (36).

24. Step-down gear system according to claim 22, wherein the guide cage (45) is guided and centered via en end wall (49) on an annular surface (49') which is concentric with the support ring (1).

25. Step-down gear system according to claim 22, wherein the guide cage (45/1) is integrally moulded on a driven annular gear (40/1) which is also of plastics material.

26. Step-down gear system according to claim 1, wherein the internal toothing (3) of the support ring (1) is designed to be radially flexible.

27. Step-down gear system according to claim 26, wherein the internal toothing (3) of the support ring (1) is attached to a thin-walled annular body part (68) which is separated from an outer thick-walled annular body part (69) by a circumferential annular groove (70) which is open on a front side.

28. Step-down gear system according to claim 1, wherein the drive core (20/1) comprises three protuberances (55) which are offset by, in each case, 120° relative to one another and are disposed on a circumscribed circle (56) which is concentric with the support ring (1).

29. Step-down gear system according to claim 1, wherein the support ring (1) is part of a cylindrical housing which surrounds the rolling bushing (5, 5/1) and the possibly provided driven annular gear (40, 40/1), and is provided at least on one end face with an end wall (43, 44).

30. Step-down gear system according to claim 1, wherein the drive core comprises three rollers (55/2) which are supported for rotation on axially parallel bearing journals (55/1), which are offset by 120° relative to one another, on a disc (20/2), the cylindrical peripheral surfaces of which rollers are disposed on a common circumscribed circle (56) which is coaxial with the axis of the drive shaft (14).

* * * * *